(12) United States Patent
Tachibana et al.

(10) Patent No.: US 6,684,492 B2
(45) Date of Patent: Feb. 3, 2004

(54) COTTER-MOUNTING APPARATUS (75) Inventors: Katsuyoshi Tachibana, Tokyo (JP); Hiroshi Yoshida, Tokyo (JP); Yoshio Kikukawa, Tokyo (JP); Satoshi Ogata, Tokyo (JP)

(73) Assignee: Hirata Corporation, Tokyo (JP)

( * ) Notice: Subject to any disclaimer, the term of this patent is extended or adjusted under 35 U.S.C. 154(b) by 0 days.

(21) Appl. No.: 10/266,289

(22) Filed: Oct. 8, 2002

(65) Prior Publication Data
US 2003/0200641 A1 Oct. 30, 2003

(30) Foreign Application Priority Data
Apr. 24, 2002 (JP) ...................................... P2002-122100

(51) Int. Cl.[7] ................................................ B23P 13/00
(52) U.S. Cl. .......................... 29/799; 29/213.1; 29/214; 29/888.46
(58) Field of Search .............................. 29/799, 888.01, 29/464, 888.46, 777, 213.1, 214, 450, 235

(56) References Cited

U.S. PATENT DOCUMENTS

| 3,793,999 A | * | 2/1974 | Seiler et al. ............. 123/90.67 |
| 5,097,579 A | | 3/1992 | Pringault |
| 5,357,675 A | | 10/1994 | Danmoto |
| 5,761,785 A | * | 6/1998 | Connolly ...................... 29/249 |
| 5,996,201 A | * | 12/1999 | Ringle ...................... 29/213.1 |

FOREIGN PATENT DOCUMENTS

| JP | 5-301133 | 11/1993 |
| JP | 2001-334430 | 12/2001 |

* cited by examiner

*Primary Examiner*—Gregory Vidovich
*Assistant Examiner*—Stephen Kenny
(74) *Attorney, Agent, or Firm*—Pillsbury Winthrop LLP (57) ABSTRACT

The present invention relates to a cotter-mounting apparatus that, by engaging a pair of cotters with engagement grooves provided on the outer circumferential surface of an axial member, mounts the pair of cotters that fix a retainer for holding a spring to exert a pressing force to the axial member in a compressed state, wherein the cotter-mounting apparatus includes a retainer holding mechanism that holds a retainer having a pair of cotters incorporated, and is driven to be relatively elevated and lowered on the upper side in the axial line direction of the axial member; a cotter separating mechanism for separating the pair of cotters from each other over the outer diameter of the axial member roughly in the horizontal direction while pushing up the pair of cotters from downward and for holding the pair of cotters; and a cotter pressing mechanism for pressing the pair of cotters separated by the cotter separating mechanism from the outside roughly in the horizontal direction and causing the cotters to be engaged with the engagement grooves positioned in advance. With such a structure, it is possible to mount cotters with a simple procedure, to increase productivity and to engage the pair of cotters with a plurality of engagement grooves without fail.

8 Claims, 10 Drawing Sheets

COTTER-MOUNTING APPARATUS

BACKGROUND OF THE INVENTION

1. Technical field of the Invention

The present invention relates to a cotter-mounting apparatus for mounting a cotter to fix a retainer that regulates an incorporated position of a coil spring disposed around an axis, and in particular to a cotter-mounting apparatus for automatically mounting a cotter to fix a retainer, which compresses a valve spring of an engine and regulates the spring, at a valve stem.

2. Description of the Related Arts

Cotter-mounting apparatuses that are disclosed by, for example, Japanese Unexamined Patent Application Publications No. 2001-334430 and No. Hei-5-301133 have been known as prior arts.

The apparatus disclosed by the former Publication is provided with a guide pin having an outer diameter that is identical to the minimum inner diameter of a pair of cotters (a pair of collets), and a slider for reciprocally accommodating the guide pin, etc. When a valve stem is opposed to the guide pin and is elevated, a pair of cotters which are held by a retainer are pushed upward from the outer circumferential side of the valve stem and is caused to move to the outer circumferential side of the guide pin. Subsequently, the cotters are pushed and widened by the tip end of the valve stem and are held on the outer circumferential side of the valve stem. After that, the cotters are engaged with a single engagement groove.

On the other hand, the apparatus disclosed by the latter Publication is provided with a finger unit consisting of a cotter guide to place and hold a pair of cotters therein and a pair of finger members, and a retainer pushing member for holding a retainer in a state where a spring is compressed, etc. When the finger unit in which a pair of cotters are placed and held is moved downward in a state where the retainer is pushed down in advance by the retainer pushing member, the cotter guide is engaged with the tip end of the valve stem and is pushed upward, and at the same time, a pair of cotters are held by the outer circumferential side of the valve stem slid therein. After that, the cotters are engaged with a single engagement groove.

However, in an apparatus equipped with the finger unit, it is necessary that the cotters and retainer are separately provided, and the retainer is pushed and held in advance, wherein the apparatus is complicated, its incorporating procedure is cumbersome, and productivity thereof is decreased.

Also, in an apparatus in which the cotters are moved to the outer circumferential side by pushing to widen the cotters by the tip end of the valve stem while slidingly pushing the same upward, since the cotters are merely pushed to be widened and moved to the outer circumferential side of the valve stem, the state of the cotters may be made unstable, wherein there is a fear that the cotters are not securely mounted at a prescribed position.

Further, in the above-described two apparatuses, since the cotters are engaged with an engagement groove while causing the same to slide along the outer circumferential side of the valve stem, if a plurality of engagement grooves are provided, the cotters may be engaged with the first engagement groove and are not moved to the next engagement groove, wherein complete mounting is not enabled.

The present invention was developed in view of the above-described problems and shortcomings of the prior arts, and it is therefore an object of the invention to provide a cotter-mounting apparatus with a simple structure, which is able to mount cotters with a simple incorporating procedure or in a short time, and is able to securely mount cotters with respect to a plurality of engagement grooves.

SUMMARY OF THE INVENTION

In order to achieve the above-described object, a cotter-mounting apparatus according to the invention is a cotter-mounting apparatus for mounting a pair of cotters to fix a retainer, which holds a spring to exert a pressing force to an axial member in a compressed state, by causing the pair of cotters to be engaged with engagement grooves formed on the outer circumferential side of the axial member, which includes: a retainer holding mechanism that holds a retainer having a pair of cotters incorporated, and is driven to be relatively elevated and lowered on the upper side in the axial line direction of the axial member; a cotter separating mechanism for separating the pair of cotters from each other over the outer diameter of the axial member roughly in the horizontal direction while pushing up the cotters from downward and for holding the cotters; and a cotter pressing mechanism for pressing a pair of cotters separated by the cotter separating mechanism from the outside roughly in the horizontal direction and causing the cotters to be engaged with engagement grooves positioned in advance.

According to the above-described construction, where the retainer holding mechanism holds a retainer having a pair of cotters incorporated, the cotter separating mechanism separates the pair of cotters over the outer diameter of the axial member roughly in the horizontal direction (by a distance roughly identical to the outer diameter or spaced therefrom over the outer diameter), and the cotter pressing mechanism presses the pair of cotters so that the pair of cotters are brought near each other and causes the pair of cotters to be engaged with the engagement grooves of the axial member, which are positioned in advance. Thus, since the cotters can be mounted with a simple procedure, productivity thereof is increased, and since the cotters are not subjected to sliding along the axial member but are brought near each other roughly from the horizontal direction (from the outside in the diametrical direction of the axial member), it is possible to securely cause the cotters to be engaged with a plurality of engagement grooves.

In the above-described construction, such a construction may be employed, wherein the retainer holding mechanism includes: an elevation head that is driven to be elevated and lowered roughly in the vertical direction; a housing fixed on the elevation head, a part of which is brought into contact with the upper end side of the retainer; at least a pair of grasping arms, which are swingably supported on the housing so as to be brought near and spaced from each other roughly in the horizontal direction; and a first cam slider having a first cam portion for yielding a cam action to swing the grasping arms and being driven to be elevated and lowered and lower roughly in the vertical direction with respect to the housing.

According to the construction, when a pair of grasping arms are driven by the first cam slider in a direction along which the grasping arms are brought near each other, the retainer having a pair of cotters incorporated is grasped, and when the elevation head is driven downward, the retainer is positioned above the axial member (for example, a valve stem). Thus, since the pair of cotters and the retainer are held together, the structure can be simplified in comparison with a case where these are held separately, and its incorporating procedure can be also simplified. In addition, since a pair of grasping arms are driven by a cam action of the cam slider moving roughly in the vertical direction, the structure can be also made small-sized and integrated.

In the above-described construction, such a construction may be employed, in which the cotter separating mechanism includes: a push-up pin having an outer diameter equal to or greater than the outer diameter of the axial member, and for pushing up the pair of cotters from downward of the retainer held by the retainer holding mechanism; a guide pin reciprocally supported by the retainer holding mechanism, having an outer diameter equal to or greater than the outer diameter of the axial member, and having its lower end portion formed to be semi-spherical; and a spring for pressing the guide pin downward against a pressing force of the push-up pin.

According to the construction, when the push-up pin pushes up a pair of cotters from downward in a state where the retainer having a pair of cotters incorporated is held by the retainer holding mechanism, the pair of cotters is expanded outward roughly in the horizontal direction along the lower end portion of the guide pin while the guide pin is being pushed up with a prescribed resistance force brought about by the spring, and when the push-up pin is caused to descend thereafter, the guide pin is lowered by a pressing force of the spring, wherein the pair of cotters are held in a state where the cotters are separated from each other by a greater distance than the outer diameter of the guide pin, that is, the outer diameter of the axial member. Thus, it is possible to separate the cotters with a simple procedure, and it is possible to insert the axial member between the cotters while continuing the separation action and to cause the engagement grooves to be opposed to each other.

In the above-described construction, another construction may be employed, in which the guide pin and spring are disposed in a space formed at the cam slider. According to the construction, since the guide pin and spring are accommodated in the cam slider and disposed therein, integration of components can be achieved, and the apparatus can be simplified as a whole.

In the above-described construction, still another construction may be employed, which has a pressing member for pressing the pair of cotters pushed upward by the push-up pin, from upward to the retainer. According to the construction, since the pressing member presses the pair of separated cotters toward the retainer, the pair of cotters, which are in a state before mounting can be securely held in a separated state.

In the above-described construction, such a construction may be employed, in which the cotter pressing mechanism includes: at least a pair of pressing arms swingably supported with respect to the housing so that the pair of pressing arms are brought near and spaced from each other roughly in the horizontal direction; and a second cam slider having a second cam portion for yielding a cam action for causing the pressing arms to swing and being driven to be elevated and lowered roughly in the vertical direction with respect to the housing.

According to the construction, when a pair of pressing arms are driven to be brought near each other by the second cam slider, the pair of cotters are pressed and are engaged with engagement grooves of the axial member (for example, valve stem). Thus, since a pair of pressing arms are driven by a cam action brought about by the second cam slider moving roughly in the vertical direction, the structure can be made small-sized and integrated.

In the above-described construction, such a construction may be employed, in which the first cam slider may be concurrently used as the second cam slider. According to the construction, since the grasping arm and pressing arm are driven by a single cam slider, the structure can be made simple, wherein a grasping action and a pressing operation can be carried out at a prescribed stable timing.

In the above-described construction, such a construction may be employed, in which the first cam portion and the second cam portion are formed so that a releasing action of the grasping made by the grasping arm can be carried out at either of the timings, which are "immediately before a pressing action made by the pressing arm", "immediately after the pressing action" or "simultaneously with the pressing action". According to the construction, time required for mounting cotters can be shortened, and productivity can be improved.

The other objects and features of this invention will become understood from the following description with reference to the accompanying drawings.

DETAILED DESCRIPTION OF THE PREFERRED EMBODIMENTS

Hereinafter, a description is given of an embodiment of the invention with reference to the accompanying drawings.

Figure 1:
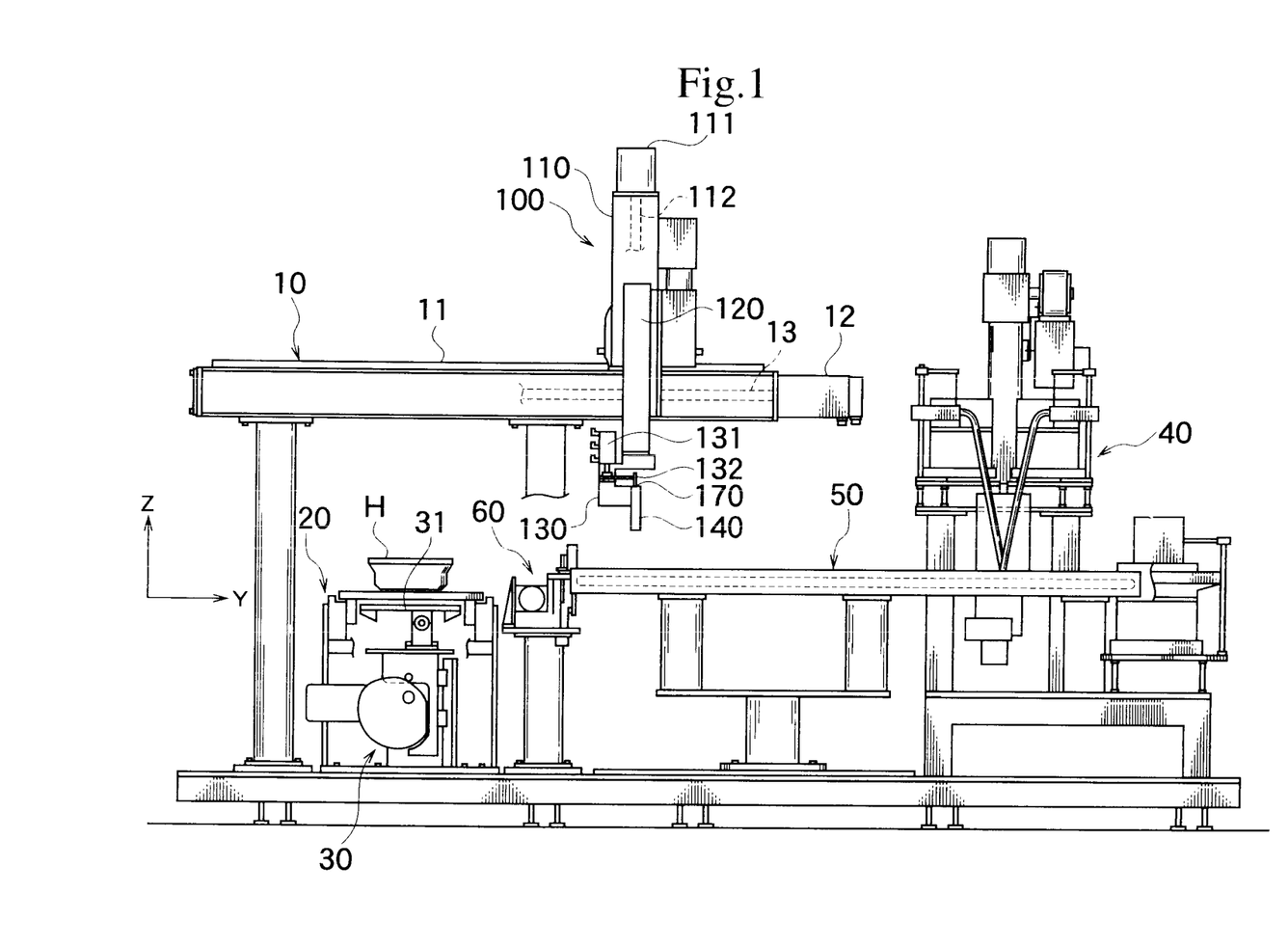
FIG. 1 is a rough configurational view showing the entirety of a system equipped with a cotter-mounting apparatus according to the invention.

A cotter-mounting apparatus according to the embodiment is provided, as shown in FIG. 1, with a frame 10 that supports a guide rail 11; a transfer conveyor 20 that holds a cylinder head H, in which an intake valve or an exhaust valve (valve stem) as an axial member and a valve spring are incorporated and transfers the same; an elevation unit 30 that raises the cylinder head H transferred by the transfer conveyor 20 and positions the same; a feeder unit 40 that feeds a retainer R having a pair of cotters C incorporated; a transfer conveyor 50 that transfers a retainer R having a pair of cotters C incorporated in the horizontal direction Y; a push-up unit 60 that holds a retainer R (and a pair of cotters C), which is transferred to a prescribed position by the transfer conveyor 50 and simultaneously pushes up a pair of cotters C; and a cotter-mounting unit 100 supported on the frame 10, which is caused to reciprocate in the horizontal direction Y, etc.

Figure 3:
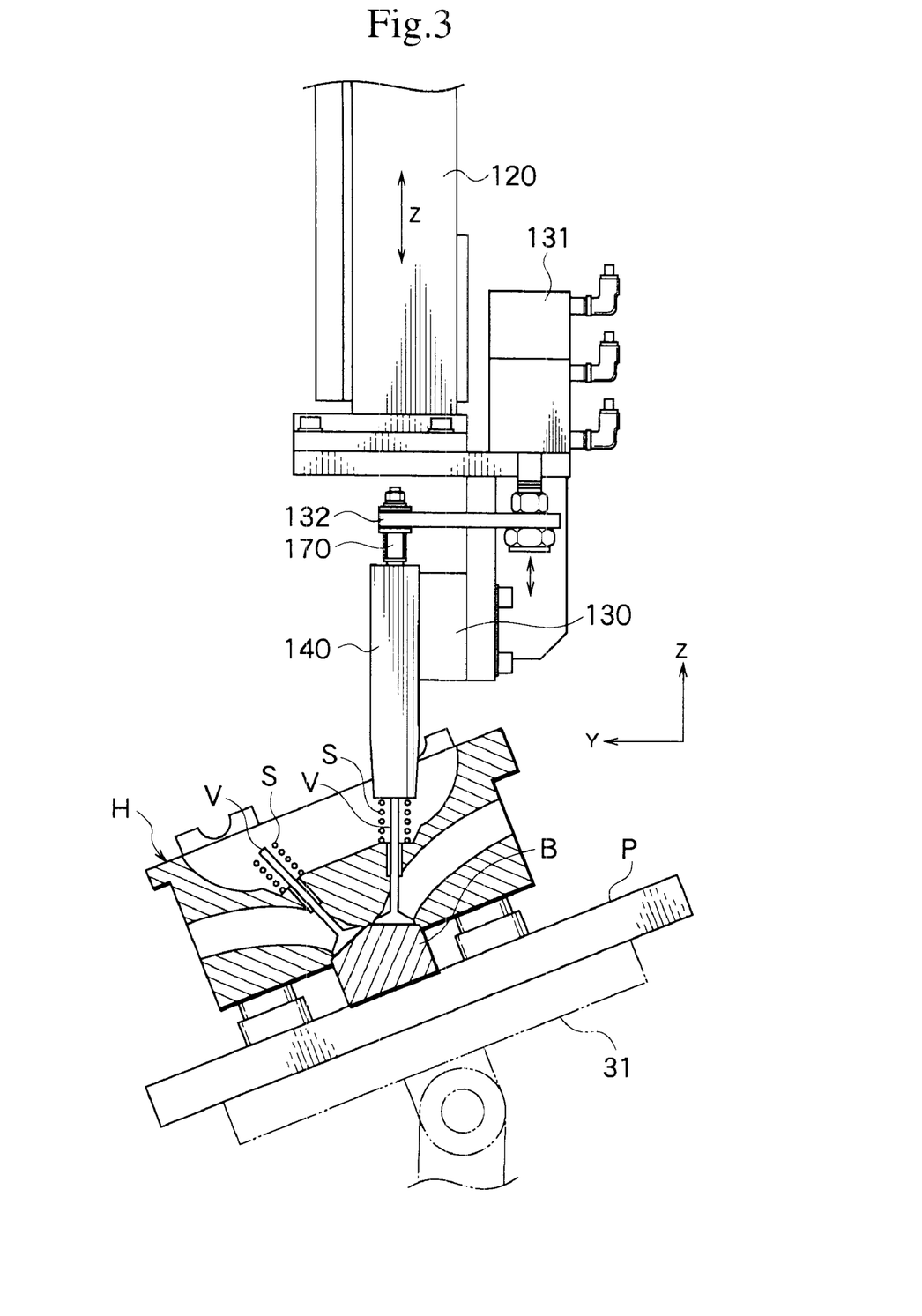
FIG. 3 is a side elevational view showing a part of the cotter-mounting unit and a cylinder head, in which a valve and a valve spring are incorporated.
Figure 4:
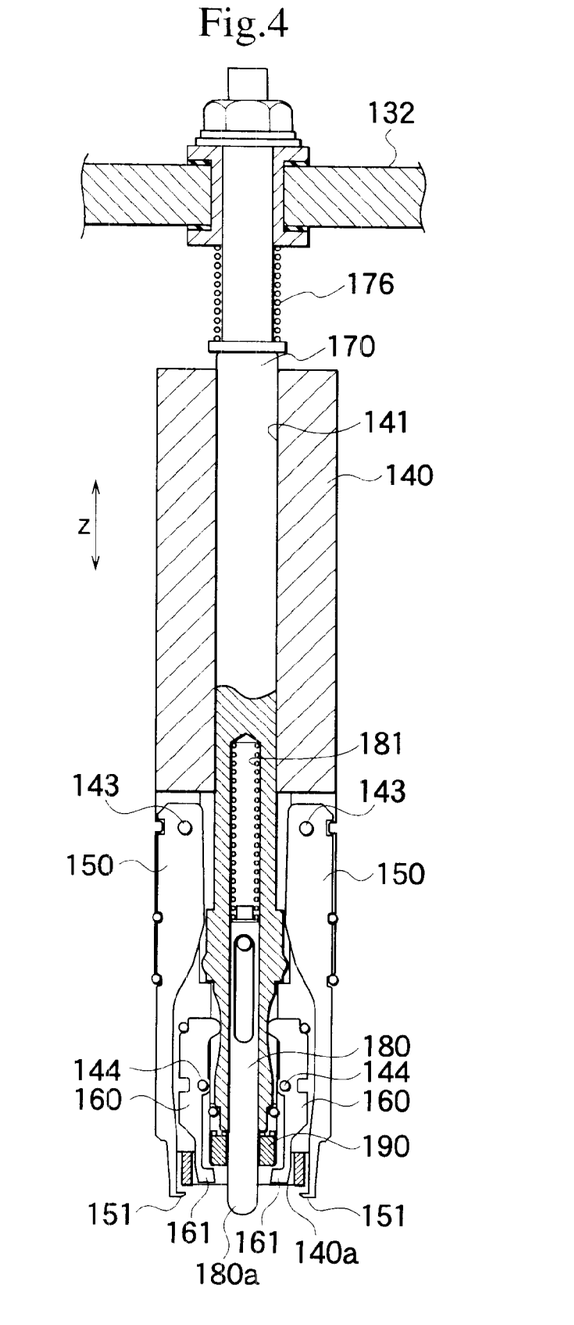
FIG. 4 is a sectional view showing the interior of the housing forming a part of the cotter-mounting unit.

The cotter-mounting unit 100 includes, as shown in FIG. 1, FIG. 3, and FIG. 4, a supporting portion 110 supported on the frame 10 and moving in the horizontal direction Y; a movable arm 120 supported on the supporting portion 110 and elevating and lowering in the vertical direction Z; an elevation head 130 fixed at the lower end portion of the movable arm 120; a housing 140 fixed at the elevation head 130; a pair of (two) grasping arms 150, two pairs of (four) pressing arms 160; a cam slider 170 for driving both arms 150 and 160; a guide pin 180 accommodated in the cam slider 170 and elevating and lowering in the vertical direction; and a coil spring 181, etc.

As shown in FIG. 1, the supporting portion 110 is caused to reciprocate in the horizontal direction Y by a motor 12 and a ball screw (lead screw) 13, which are provided on the frame 10.

As shown in FIG. 1, the movable arm 120 is driven to be elevated and lowered in the vertical direction Z by a motor 111 and a ball screw (lead screw) 112, which are provided at the supporting portion 110. The elevation head 130 is provided with an actuator 131 operating in the vertical direction Z and a holding plate 132 connected to the actuator 131, and the holding plate 132 holds the upper end portion of the cam slider 170 that is movably supported in the vertical direction Z in the housing 140. That is, since the actuator 131 operates, the cam slider 170 is driven to be elevated and lowered in the vertical direction Z via the holding plate 132.

Figure 2:
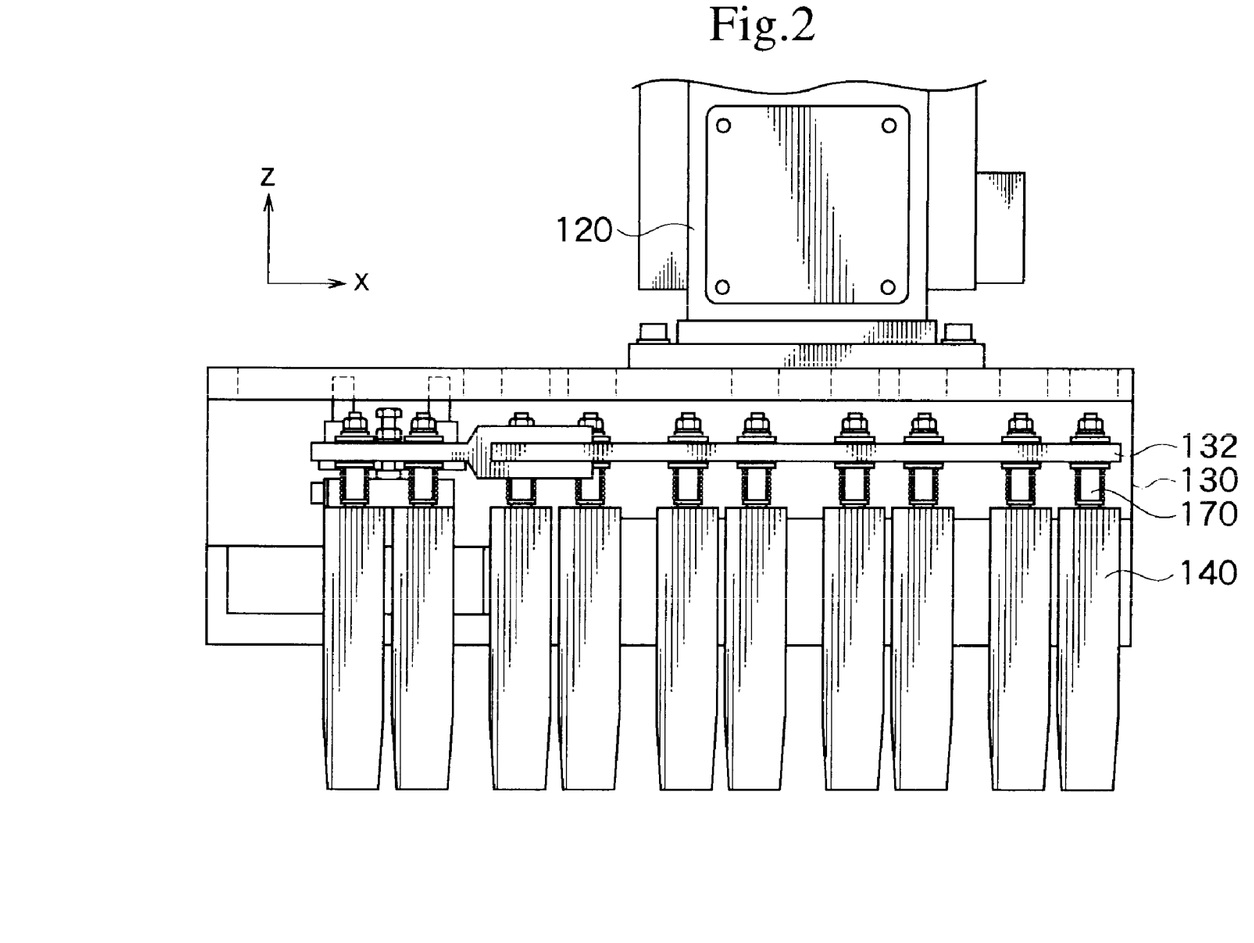
FIG. 2 is a side elevational view showing a housing forming a part of a cotter-mounting unit, and its peripheral components.

In addition, as shown in FIG. 2 and FIG. 3, five sets of housings 140 (in which two housings are formed as a set) (ten housings) are fixed to the elevation head 130 so as to be arranged in a line in the horizontal direction X orthogonal to the horizontal direction Y. Respective sets of (two) housings 140 are composed so as to correspond to two valves V and valve springs S, which are disposed for one combustion chamber of the cylinder H. Therefore, it is possible to simultaneously mount a plurality of pairs of cotters C in not only a serial five-cylinder engine and a V-type ten-cylinder engine but also an engine in which the number of cylinders is smaller than the above.

Figure 5:
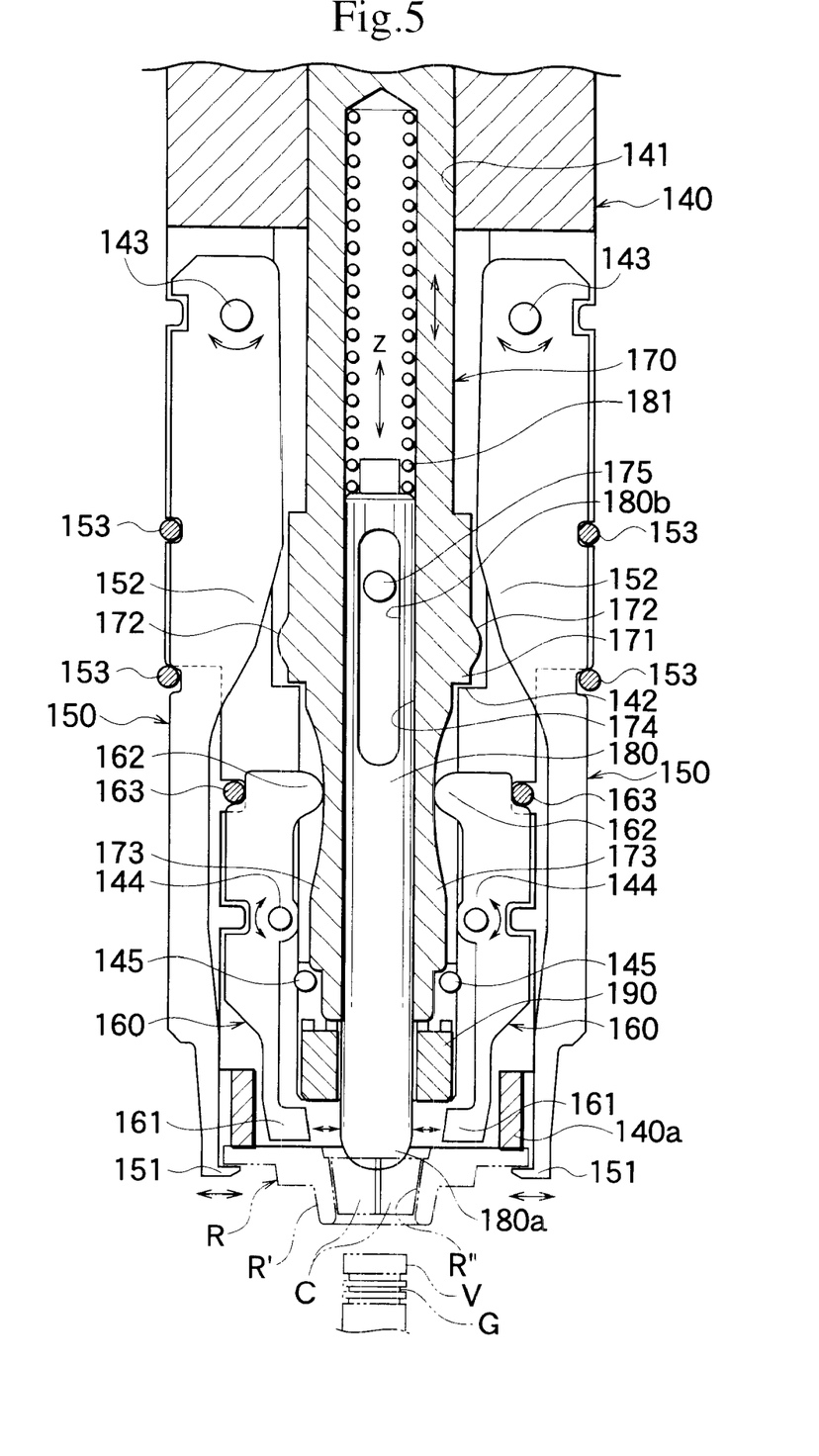
FIG. 5 is a sectional view in which the downward area of the housing is enlarged.

As shown in FIG. 4 and FIG. 5, a through-hole 141 passing through the center is formed in the housing 140. The cam slider 170 is slidably inserted into the through-hole 141. The cam slider 170 is driven to be elevated and lowered in the vertical direction Z relative to the housing 140, and the cam slider 170 is pressed downward by a spring 176 disposed between the cam slider 170 and the holding plate 132. Since the stepped portion 171 thereof is brought into contact with a stopper 142, further downward movement of the cam slider 170 beyond the stopper 142 is regulated with respect to the housing 140.

As shown in FIG. 5, the cam slider 170 has a first cam portion 172 and a second cam portion 173 on the outer circumference thereof and functions as a first cam slider that exerts a cam action to the grasping arm 150 and as a second cam slider that exerts a cam action to the pressing arm 160. In addition, a guide passage 174 as a space is formed inside the cam slider 170, in which the guide pin 180 and the coil spring 181 pressing the guide pin 180 downward (so as to protrude) are disposed.

Thus, since the grasping arm 150 and the pressing arm 160 are driven by one cam slider 170, the structure can be simplified in comparison with a case where two cam sliders are provided, and since the relative positions of the first cam portion 172 and the second cam portion 173 are defined, it is possible to cause the grasping arm 150 and the pressing arm 160 to carry out stabilized grasping motion and pressing motion at prescribed timings.

Herein, at the first cam portion 172 and the second cam portion 173, the timing to release the grasping by the grasping arm 150 is set to either of "immediately before", "immediately after" or "roughly simultaneously with" the timing at which a pressing motion is carried out by the pressing arm 160. By employing such timing, the mounting procedures of cotters C can be shortened, and productivity thereof can be increased.

Also, since the grasping arm 150 and pressing arm 160 are driven by only reciprocal movement of the cam slider 170 in the vertical direction Z, the structure can be made compact and small-sized. Further, since the guide pin 180 and coil spring 181 are disposed in the cam slider 170, components can be made compact, and the apparatus can be simplified as a whole.

A retainer holding mechanism that holds a retainer R in which a pair of cotters C are incorporated and is driven to be relatively elevated and lowered upside in the axial line direction of the valve (stem) V is composed of the above-described elevation head 130, housing 140, a pair of grasping arms 150, a cam slider 170, etc.

As shown in FIG. 5, the guide pin 180 has a diameter which is equivalent to or larger than the outer diameter of the valve stem (in particular, the portion in which a plurality of engagement grooves G are formed) as an axial member, and the lower end portion 180a thereof is formed semi-spherical. Also, the guide pin 180 has a long slot 180b formed so as to be open on the outer circumferential surface thereof, and a pin 175 formed so as to protrude from the cam slider 170 is idly inserted into the long slot 180b. Therefore, the guide pin 180 stops at a position extremely protruding from the cam slider 170 by a pressing force of the coil spring 181 when not being operated.

Also, the guide pin 180 operates so as to separate a pair of cotters C, which are pushed up by a push-up pin 65 described later, in the horizontal direction while guiding the cotters C upward by the semi-spherical lower end portion 180a thereof. Herein, the pressing force of the coil spring 181 is set to such a value by which the guide pin 180 is raised by a push-up force with a prescribed resistance force held, and a pair of cotters C are moved outside in the horizontal direction along the lower end portion 180a of the guide pin 180.

A cotter separating mechanism that separates a pair of cotters C from each other over the outer diameter of the axial member (valve stem V) roughly in the horizontal direction while pushing up the cotters C from downward and holds the same is composed of the above-described guide pin 180, coil spring 181, the push-up pin 65 described later, etc.

Further, as shown in FIG. 4 and FIG. 5, a pair of (two) grasping arms 150 and two pairs of (four) pressing arms 160 (in the drawing, only a pair is illustrated) are swingably disposed around supporting axes 143 and 144 in the housing 140.

Two grasping arms 150, respectively, have a grasping claw 151 at the lower end part thereof and a follower portion 152 at the intermediate portion thereof. The grasping claws 151 are devised so as to be brought near and isolated from each other roughly in the horizontal direction by swinging around the supporting axis 143. Herein, outward movement of the grasping arm 150 is regulated by a ring-shaped spring 153.

That is, since the cam slider 170 moves downward and the first cam portion 172 is isolated from the follower portion 152, the grasping claws 151 are drawn near each other by a pressing force of the spring 153 and grasps the retainer R. On the other hand, since the cam slider 170 is elevated and the first cam portion 172 is engaged with the follower portion 152, the grasping claws 151 are isolated from each other against the pressing force of the spring 153 to release the grasping of the retainer R.

Also, the grasping arm 150 is not limited to a pair of (two) arms, but may be composed of three or four, or more arms.

Four pressing arms 160, respectively, have a pressing piece 161 at the lower end part thereof and a follower portion 162 at the upper end part thereof, and are composed so that, by swinging thereof around the supporting axis 144, the pressing pieces 161 are drawn near and isolated from each other roughly in the horizontal direction. Herein, the pressing arms 160 are pressed so that the arms 160 are turned in a direction along which the pressing pieces 161 are separated from each other by the ring-shaped spring 163. Also, the four pressing arms 160 are disposed with spacing of 90 degrees therebetween, wherein the pressing arms 160 are composed so that the respective two pressing arms 160 carry out a pressing motion with respect to at least one of a pair of cotters C.

That is, as the cam slider 170 is lowered and the second cam portion 173 does not exert its cam action onto the follower portion 162, the four pressing pieces 161 are isolated from each other by a pressing force of the spring 163, and the pressing of a pair of cotters C is released. On the other hand, as the cam slider 170 is elevated and the second cam portion 173 is engaged with the follower portion 162, the four pressing pieces 161 press a pair of cotters C inwardly against the pressing force of the spring 163 to cause the pair of cotters C to be engaged in an engagement groove G of a valve V (valve stem) which is positioned in advance.

Further, the pressing arms 160 are not limited to two pairs (four), but may be provided with a pair of (two) arms or more than four arms.

A cotter pressing mechanism that presses a pair of cotters C, which is separated by the cotter separating mechanism, from outside roughly in the horizontal direction, and causes the cotters C to be engaged with the engagement groove G of a valve stem V, which is positioned in advance, is composed of the above-described two pairs of pressing arms 160 and the cam slider 170, etc.

Also, as shown in FIG. 5, in the housing 140, an annular pressing member 190 is disposed around the guide pin 180 in the lower area of the cam slider 170. The pressing member 190 functions so as to press a pair of cotters C, which are separated around the guide pin 180, onto the upper end side of the retainer R and holds the same thereon, wherein the lower end position thereof is regulated by a stopper (not illustrated), which is formed on the housing 140, while the upper end position thereof is regulated by the pin 145, provided with the housing 140.

That is, in a non-operated state, the pressing member 190 is pressed to the lower end part 176 of the cam slider 170 that is pressed by the spring 176, and is positioned at the lower end position. Even if the cam slider 170 is elevated, the pressing member 190 does not elevate beyond the pin 145 and is separated from the cam slider 170. Therefore, oil adhered to the valve V, etc., is intercepted at the pressing member 190 and is prevented from spreading to the cam slider 170.

Herein, in a state where the pressing member 190 is located at the lower end position, the pressing piece 161 can enter the lower area thereof.

Further, as shown in FIG. 5, the housing 140 has a lower end portion (a part) 140, which is brought into contact with the upper end side of the retainer R, at a position protruding downward from the pressing piece 161, and holds the retainer R in cooperation with the grasping claws 151. Also, the lower end portion 140a functions to receive a reaction force when compressing the valve spring S by pressing it downward.

The feeder unit 40 feeds retainers R having a pair of cotters C incorporated, two by two, onto the transfer conveyor 50.

Figure 7:
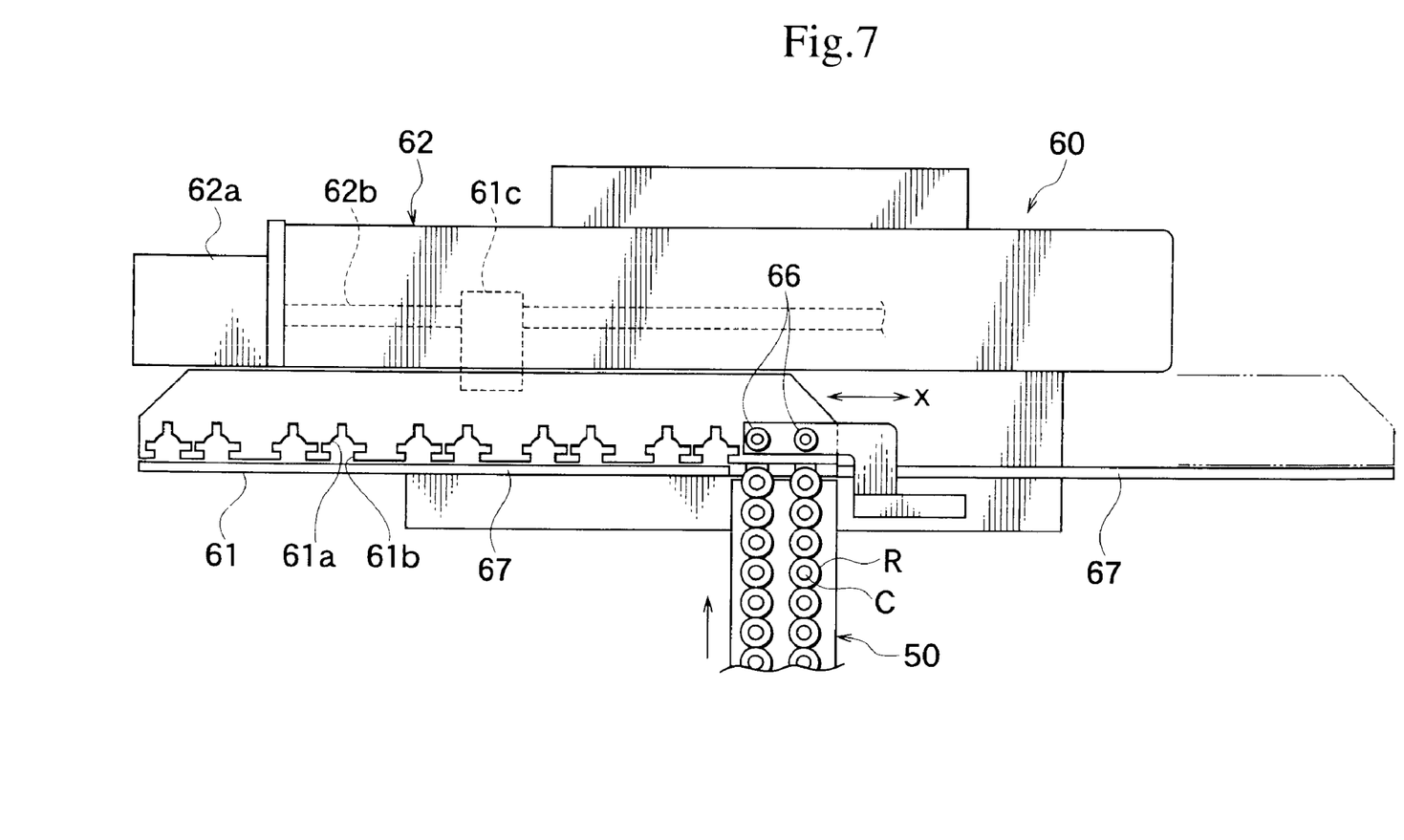
FIG. 7 is a plan view showing the push-up unit and a part of a transfer conveyor.

As shown in FIG. 1 and FIG. 7, the transfer conveyor 50 is a chain conveyor that consecutively transfers retainers R, in which cotters C are incorporated, toward the push-up unit 60 with the retainers R arranged in two rows, and is also a free-flow type conveyor in which, when the retainer R located at the head of rows stops, the subsequent retainer R stops, and only the chain conveyor idly turns.

Figure 6:
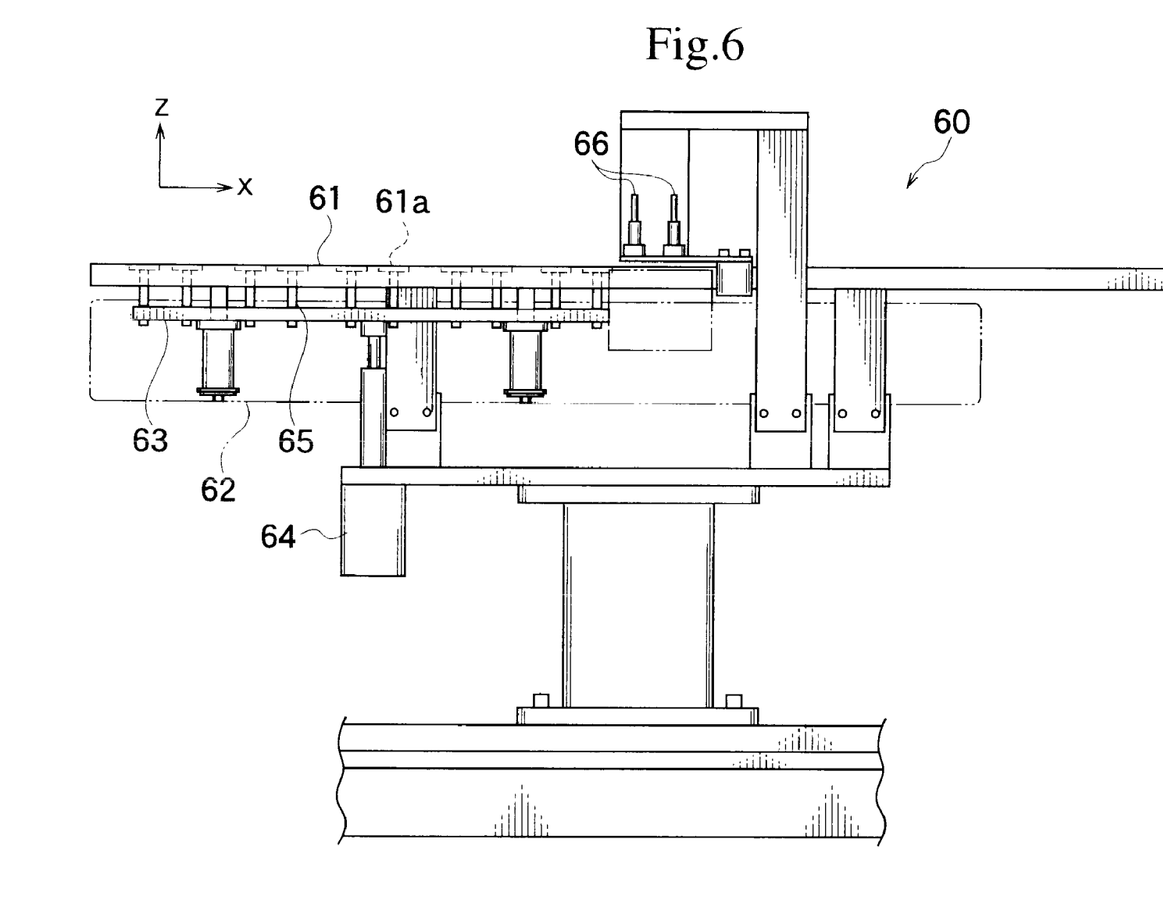
FIG. 6 is a side elevational view showing a push-up unit provided with a push-up pin.

As shown in FIG. 6 and FIG. 7, the push-up unit 60 is provided with a pallet 61 extending in the horizontal direction X; a drive mechanism 62 for causing the pallet 61 to reciprocate in the horizontal direction X; an elevation plate 63 elevating and lowering in the vertical direction Z; an actuator 64 driving to elevate and lower the elevation plate 63; ten push-up pins 65 held on the elevation plate 63; a sensor 66 for detecting retainers R that are transferred by the transfer conveyor 50, a regulation plate 67 for preventing the retainers R held on the pallet 61 from dropping, etc.

Ten holding holes 61a are formed on the pallet 61 at intervals corresponding to the ten housings 140. A notch 61b is formed at the respective holding holes 61a, and the notch 61b receives the lower portion protrusion R' of a retainer R that is transferred by the transfer conveyor 50 and leads the retainer R into the holding hole 61a.

The regulation plate 67 is fixed at a position adjacent to the pallet 61 so that only the portion faced to the transfer conveyor 50 is notched to permit transfer of retainers R, and portions other than the above close the notch 61b of the holding hole 61a, whereby the retainers R are prevented from dropping from the holding holes 61a.

The drive mechanism 62 is composed of a motor 62a, a ball screw (lead screw) 62b driven by the motor 62a, and a connection piece 61c of the pallet 61 screwed in the ball screw 62b, wherein the motor 62a rotates to cause the pallet 61 to move in the horizontal direction X.

The push-up pin 65 has an outer diameter equal to or greater than the outer diameter of the valve stem and functions so as to push up a pair of cotters C from the lower side of the retainer R if the elevation plate 63 is elevated by the actuator 64 after the lower end portion 140a of the housing 140 is brought into contact with the retainer R (the upper end side thereof) held in the holding hole 61a and is grasped by the grasping arms 150.

The sensor 66 detects a retainer R that is transferred by the transfer conveyor 50. When two retainers R are held by two holding holes 61a, the sensor 66 detects this and emits a signal to the drive mechanism 62, wherein feeding drive of the pallet 61 is carried out, and the next two holding holes 61a are faced to the transfer conveyor 50.

The transfer conveyor 20 is a free-flow type roller conveyor that transfers a pallet P on which a cylinder head H is placed and fixed, and a stopper (not illustrated) protrudes at a prescribed position and stops the pallet P. Herein, as shown in FIG. 3, a valve V and a valve spring S are incorporated, in advance, in the cylinder head H placed and fixed on the pallet P, and a supporting block B that supports the valve V from the combustion chamber side is disposed therein.

The elevation unit 30 is provided with an elevation base 31 having a tilt mechanism that is able to be elevated and lowered by means of a cam drive mechanism and to adjust the inclination angle. That is, the elevation unit 30 raises and positions, by the elevation base 31, the pallet P that is transferred to a prescribed position by the transfer conveyor 20, and simultaneously, as shown in FIG. 3, the inclination angle of the elevation base 31 is adjusted by the tilt mechanism so that the axial direction of the valve V incorporated in advance is turned to the vertical direction Z.

Next, a description is given of motions of the apparatus with reference to FIGS. 8A through 8E, FIGS. 9A through 9D, and FIGS. 10A through 10I.

First, retainers R having a pair of cotters C incorporated are fed by the feeder unit 40, and the retainers R are transferred by the transfer conveyor 50 in a state where the retainers R are arranged in two rows. As the retainers R reach the area of the push-up unit 60, the sensor 66 detects the transferred retainers R, wherein the drive mechanism 62 sequentially drives the pallets P and causes all the holding holes 61a to hold the retainers R.

As the holding of retainers R is completed, the pallet P moves and positions ten retainers R at the positions corresponding to the ten push-up pins 65.

Figures 8A, 8B:
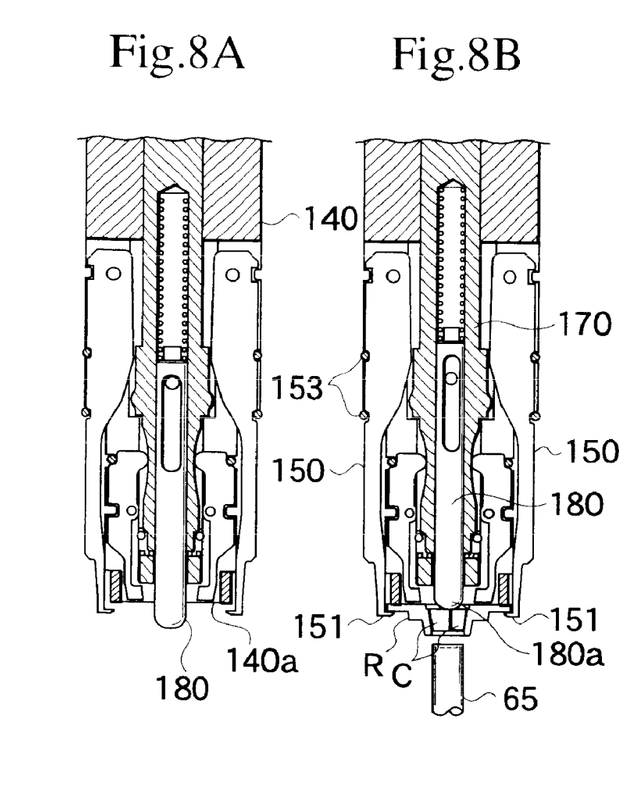
FIGS. 8A through 8E are views showing movement states when mounting the cotters.

Subsequently, the cotter-mounting unit 100 is moved in the horizontal direction Y and ten housings 140 are positioned so that these come directly above the ten retainers R. Next, the movable arm 120 is lowered, and the housing 140 which is in a state shown in FIG. 8A is brought near the retainers R, and the lower end portions 140a thereof are brought into contact with the upper end side of the retainers R.

Figure 10A:
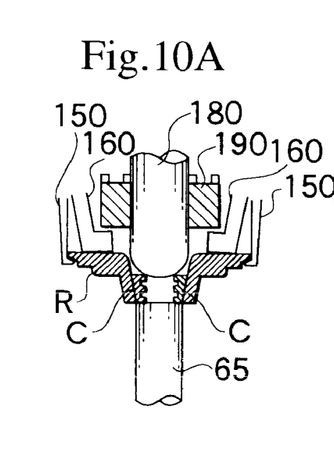
FIGS. 10A through 10I are views showing movement states when mounting the cotters.

Prior to the lower end portion 140a being brought into contact with the upper end side of a retainer R, the cam slider 170 is elevated, and the grasping arms 150 are expanded outward by an action of the first cam portion 172, and is able to receive a retainer R. As the retainer R is brought into contact with the lower end portion 140a, the cam slider 170 is lowered, and the grasping arms 150 are brought near each other, wherein the grasping claws 151 nip the retainer R from both sides thereof. Therefore, a pair of grasping arms 150 enter a state where the retainer R is held, as shown in FIG. 8B. At this time, as shown in FIG. 8B and FIG. 10A, the guide pin 180 is held in a state, where it is in contact with a pair of cotters C, by a pressing force of the coil spring 181.

Also, in a grasping action, the lower end portions of the grasping claws 151 are formed tapered. When the grasping claws 151 are brought into contact with a retainer R, and is expanded outward by the outer edge portion of the retainer R, wherein, at the point of time when the upper end side of the retainer R is brought into contact with the lower end portion 140a of the housing 140, the grasping claws 151 are returned to their original positions by a pressing force of the spring 153, the grasping action may be completed.

Figure 8C:
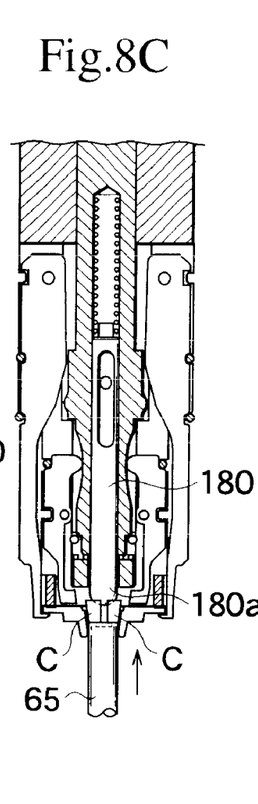
Figure 8D:
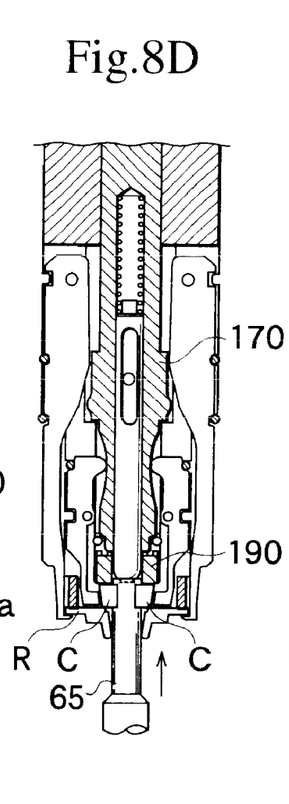
Figure 10B:
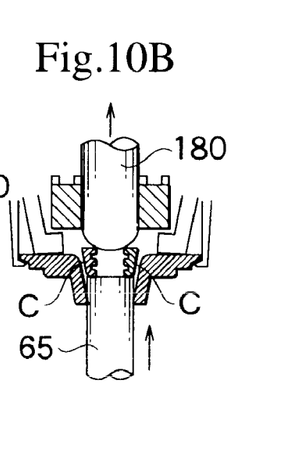

When the push-up pin 65 is driven and elevated, as shown in FIG. 8C and FIG. 10B, the pair of cotters C and the guide pin 180 are pushed up, and at the same time, the pair of cotters C are isolated from each other outside in the horizontal direction along the lower end portion 180a of the guide pin 180. As shown in FIG. 8D, the pair of cotters C are completely separated from each other by the outer circumferential side of the push-up pin 65. At this time, the pair of cotters C are nipped between the pressing member 190 and the retainer R in the up and down direction.

Figure 8E:
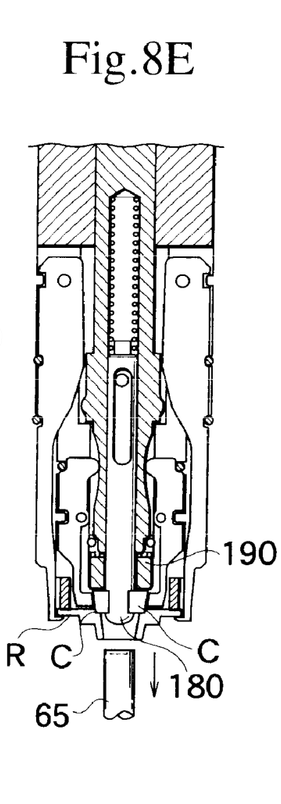
Figure 10C:
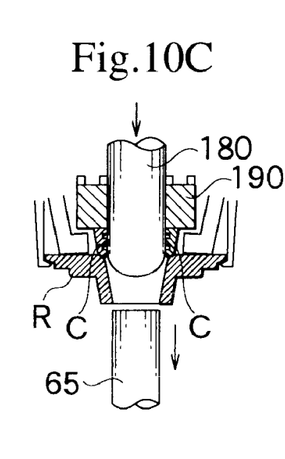

Subsequently, as the push-up pin 65 is lowered, as shown in FIG. 8E and FIG. 10C, the guide pin 180 is pushed down by a pressing force of the coil spring 181 and is inserted between the pair of separated cotters C, whereby a make-ready operation for mounting the cotters C in engagement grooves G in the valve stem is completed.

Figure 9A:
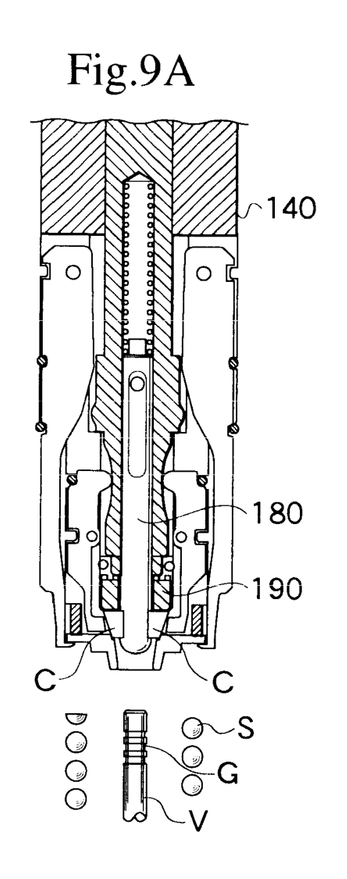
FIGS. 9A through 9D are views showing movement states when mounting the cotters.
Figure 10D:
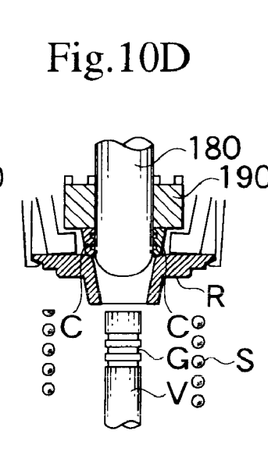

Next, as the movable arm 120 is elevated to a height of a prescribed position, the cotter-mounting unit 100 moves in the horizontal direction Y upward of the cylinder head H on the elevation base 31 set in advance. Then, as shown in FIG. 9A and FIG. 10D, the valve V (valve stem) and guide pin 180 are positioned so that these are arranged in a straight line.

Figures 9B, 9C, 9D:
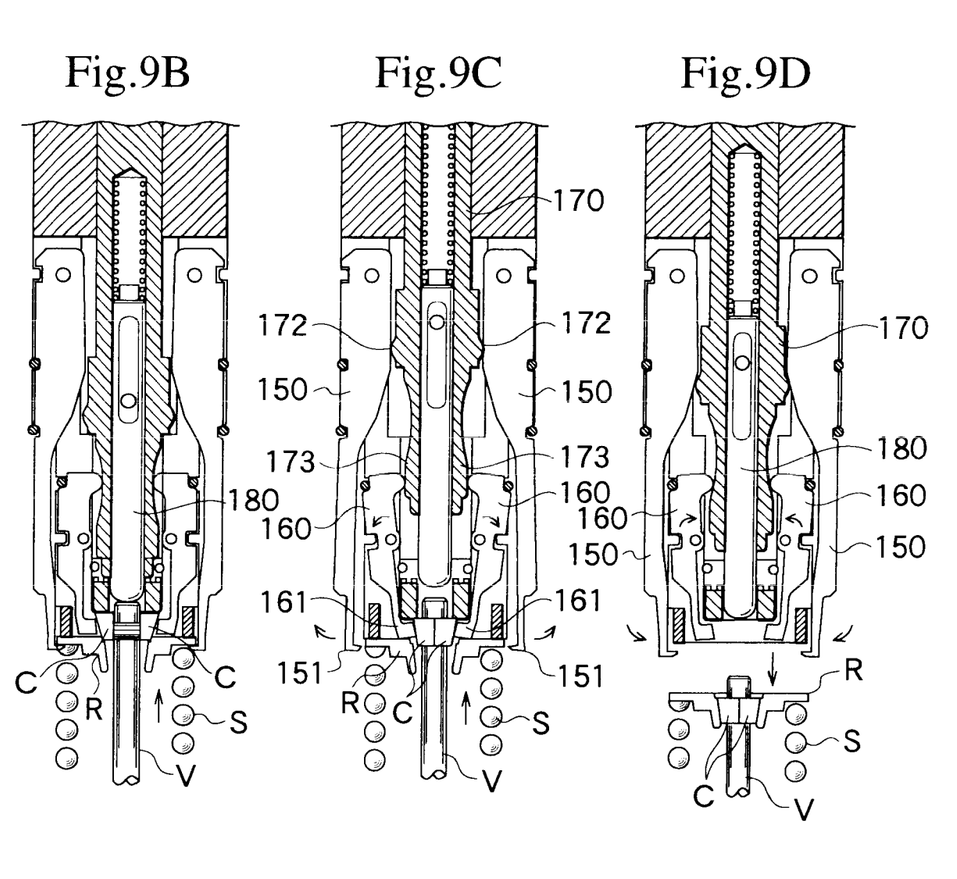
Figure 10E:
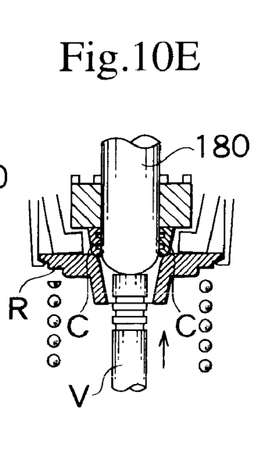
Figure 10F:
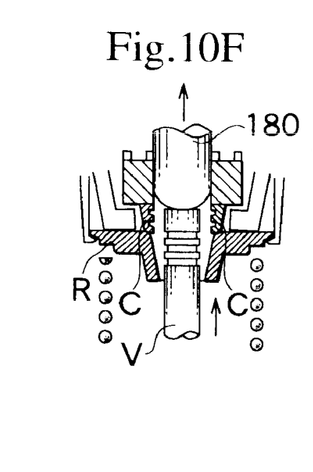

Continuously, as the movable arm 120 is lowered, as shown in FIG. 10E and FIG. 10F, the valve V (valve stem) is relatively elevated and is caused to enter the inside of the retainer R while pushing up the guide pin 180. After that, at a position where the valve V (valve stem) reaches the position shown in FIG. 9B, the valve stem is positioned.

Figure 10G:
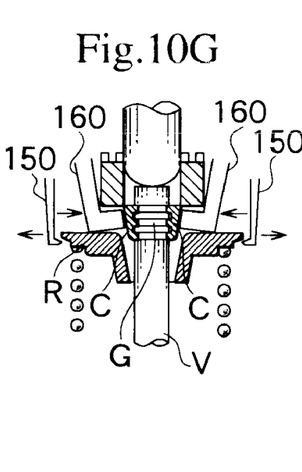

Subsequently, as the cam slider 170 is elevated, as shown in FIG. 9C and FIG. 10G, the pressing arms 160 are turned in the direction, along which the pressing arms 160 are brought near each other, by an action of the second cam portion 173, and the pressing pieces 161 press the pair of cotters C into the engagement grooves G of the valve stem and causes the cotters C to be engaged therewith. Simultaneously, the grasping arms 150 are turned outward by an action of the first cam portion 172 so that the arms 150 are isolated from each other, and the grasping claws 151 release the grasping of the retainer R.

Figure 10H:
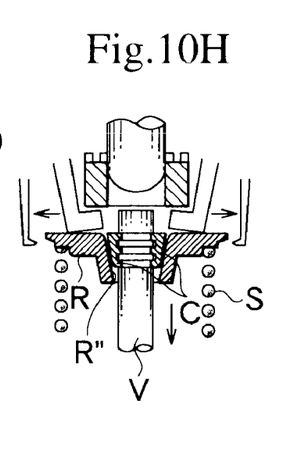
Figure 10I:
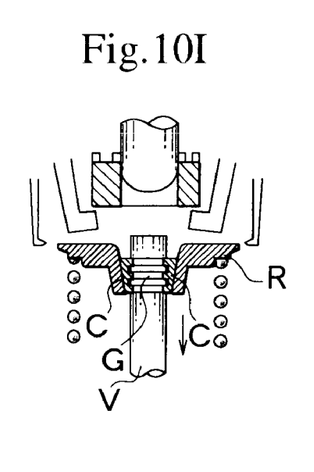

After that, as the cam slider 170 is lowered, and simultaneously, the movable arm 120 is elevated, as shown in FIG. 10H, the pair of cotters C and the valve stem are relatively lowered toward a fitting hole R" of the retainer R, whereby the valve spring S pushes up the retainer R, and at the same time, the pair of cotters C are completely fitted to the fitting hole R" of the retainer R as shown in FIG. 9D and FIG. 10I, wherein the pair of cotters C are completely mounted in the engagement grooves G of the valve stem.

After that, the cylinder head H is held again in a state where the cylinder head H is inversely inclined by the elevation base 31, and retainers R and cotters C are mounted on another valve V and valve spring S. Also, at this time, feeding, transferring, holding, separating and pressing operations of retainers R and a pair of cotters C are carried out as described above.

Through the above-described processes, as the mounting of retainers R and cotters C is completed, the elevation base 31 causes the pallet P to be returned to the horizontal state, and to be further returned onto the transfer conveyor 20. After that, a cylinder head H in which the cotters C and retainer R are incorporated is transferred to a subsequent process by the transfer conveyor 20.

In the above-described embodiment, although a pair of swingable grasping arms 150 are employed as a part of the retainer holding mechanism, and two pairs of pressing arms 160 are employed as a part of the cotter pressing mechanism, any other mechanism may be employed as long as it is capable of grasping the retainers R and pressing the cotters C in the horizontal direction. That is, it is not necessary that these are limited to a swinging type arm and any other mechanism may be employed.

Also, in the above-described embodiment, as shown in FIG. 8A through FIG. 8E and FIG. 9A through FIG. 9D, although, prior to grasping the retainers R, a pair of grasping arms 150 are stopped at a position where these are brought near each other and are in a waiting state, the arms 150 may be set so that, as shown in FIG. 9C, prior to grasping the retainers R, these arms 150 are stopped at a position where they are isolated from each other and are in a waiting state. If such a structure is employed, the time required for a grasping action can be shortened, and productivity thereof can be further improved.

Further, in the above-described above embodiment, such a structure is shown, in which ten retainers R having a pair of cotters C incorporated are simultaneously grasped, and ten sets of cotters C are simultaneously mounted. However, another structure may be employed, in which cotters C and retainers R, whose quantities are other than the above, are mounted.

Still further, in the above-described embodiment, intake and exhaust valves of an engine are shown as axial members in which cotters are mounted. However, the cotter-mounting apparatus may be applicable to other axial members used for office automation equipment, etc., as well.

As described above, with a cotter-mounting apparatus according to the invention, when feeding a pair of cotters incorporated in a retainer and mounting the cotters in engagement grooves of an axial member, the pair of cotters are once isolated from each other in the horizontal direction, and thereafter the pair of cotters are brought near each other from outside in the diametrical direction of the axial member and are engaged with the engagement grooves, whereby the cotters can be mounted with only a simple procedure, productivity thereof can be improved, and it is possible to mount cotters in a plurality of engagement grooves without fail.

In particular, since one cam slider making straight reciprocation motions and swinging type grasping arms and pressing arms, which are driven by the cam slider, are employed as a retainer holding mechanism and a cotter pressing mechanism, simplification and small-sizing of the apparatus can be brought about.

Still further, since a releasing action of the grasping made by the grasping arms can be carried out at either of the timings, which are "immediately before a pressing action made by the pressing arm", "immediately after the pressing action" or "simultaneously with the pressing action", the time required for mounting cotters can be shortened, and productivity can be improved.

It is further understood by those skill in the art that the foregoing description is a preferred embodiment of the disclosed apparatus and that various changes and modifications may be made in the invention without departing from the spirit and scope thereof.

What is claimed is:

1. A cotter-mounting apparatus for mounting a pair of cotters to fix a retainer, which holds a spring to exert a pressing force to an axial member in a compressed state, by causing the pair of cotters to be engaged with engagement grooves formed on the outer circumferential side of the axial member, comprising:

a retainer holding mechanism that holds a retainer having a pair of cotters incorporated, and is driven to be relatively elevated and lowered on an upper side in an axial line direction of the axial member;

a cotter separating mechanism for separating the pair of cotters from each other over an outer diameter of the axial member roughly in the horizontal direction while pushing up the pair of cotters from downward and for holding the pair of cotters; and a cotter pressing mechanism for pressing the pair of cotters separated by the cotter separating mechanism from an outside roughly in the horizontal direction and causing the pair of cotters to be engaged with the engagement grooves positioned in advance.

2. The cotter-mounting apparatus according to claim 1, wherein the retainer holding mechanism includes: an elevation head that is driven to be elevated and lowered roughly in the vertical direction; a housing, fixed on the elevation head, a part of which is brought into contact with an upper end side of the retainer; at least a pair of grasping arms, which are swingably supported on the housing so as to be brought near and spaced from each other roughly in the horizontal direction; and a first cam slider having a first cam portion for yielding a cam action to swing the grasping arms and being driven to be elevated and lowered and lower roughly in the vertical direction with respect to the housing.

3. The cotter-mounting apparatus according to claim 1, wherein the cotter separating mechanism includes: a push-up pin having an outer diameter equal to or greater than an outer diameter of the axial member and for pushing up the pair of cotters from downward of the retainer held by the retainer holding mechanism; a guide pin reciprocally supported by the retainer holding mechanism, having an outer diameter equal to or greater than the outer diameter of the axial member, and having its lower end portion formed to be semi-spherical; and a spring for pressing the guide pin downward against a pressing force of the push-up pin.

4. The cotter-mounting apparatus according to claim 3, wherein the guide pin and the spring are disposed in a space formed at the cam slider.

5. The cotter-mounting apparatus according to claim 3, further including a pressing member for pressing the pair of cotters pushed upward by the push-up pin, from upward to the retainer.

6. The cotter-mounting apparatus according to claim 2, wherein the cotter pressing mechanism includes: at least a pair of pressing arms swingably supported with respect to the housing so that the pair of pressing arms are brought near and spaced from each other roughly in the horizontal direction; and a second cam slider having a second cam portion for yielding a cam action for causing the pressing arms to swing and is driven to be elevated and lowered roughly in the vertical direction with respect to the housing.

7. The cotter-mounting apparatus according to claim 6, wherein the first cam portion is concurrently used as the second cam slider.

8. The cotter-mounting apparatus according to claim 6, wherein the first cam portion and the second cam portion are formed so that a releasing action of a grasping made by the grasping arms is carried out at either of the timings, which are "immediately before a pressing action made by the pressing arm", "immediately after the pressing action" or "simultaneously with the pressing action".

* * * * *